(12) United States Patent
Jonsson

(10) Patent No.: US 7,323,791 B2
(45) Date of Patent: Jan. 29, 2008

(54) LOUVERED HORIZONTAL WIND TURBINE

(76) Inventor: Stanley C. Jonsson, 442 Hillcrest Rd., San Mateo, CA (US) 94402

( * ) Notice: Subject to any disclaimer, the term of this patent is extended or adjusted under 35 U.S.C. 154(b) by 11 days.

(21) Appl. No.: 11/390,233

(22) Filed: Mar. 27, 2006

(65) Prior Publication Data

US 2007/0222224 A1 Sep. 27, 2007

(51) Int. Cl.
*F03D 9/00* (2006.01)
*H02P 9/04* (2006.01)

(52) U.S. Cl. .......................................... 290/55; 290/44

(58) Field of Classification Search ................. 290/44, 290/55; 415/2.1, 4.5, 7, 4.2; 416/119, 111
See application file for complete search history.

(56) References Cited

U.S. PATENT DOCUMENTS

| | | | | |
|---|---|---|---|---|
| 94,641 A | * | 9/1869 | Piper | 415/45 |
| 103,742 A | * | 5/1870 | Heald | 415/33 |
| 222,256 A | * | 12/1879 | Dewees | 415/155 |
| 232,558 A | * | 9/1880 | Smith | 415/4.2 |
| 273,642 A | * | 3/1883 | Toombs | 415/4.2 |
| 293,509 A | * | 2/1884 | Petersen | 416/119 |
| 485,933 A | * | 11/1892 | Herman | 416/119 |
| 543,462 A | | 7/1895 | Bramwell | |
| 1,586,914 A | * | 6/1926 | Palm | 415/150 |
| 2,231,749 A | * | 2/1941 | Damerell | 416/233 |
| 3,697,193 A | * | 10/1972 | Phillips | 416/223 R |
| 4,293,274 A | * | 10/1981 | Gilman | 416/51 |
| 4,551,631 A | * | 11/1985 | Trigilio | 290/55 |
| 4,598,210 A | * | 7/1986 | Biscomb | 290/43 |
| 4,659,940 A | | 4/1987 | Shepard | |
| 4,692,098 A | * | 9/1987 | Razinsky et al. | 416/223 R |
| 4,818,888 A | | 4/1989 | Lenoir, III | |
| 4,832,569 A | | 5/1989 | Samuelsen et al. | |
| 5,083,899 A | | 1/1992 | Koch | |
| 5,463,257 A | * | 10/1995 | Yea | 290/55 |
| 5,591,004 A | | 1/1997 | Aylor | |
| 5,765,990 A | | 6/1998 | Jones | |
| 6,015,258 A | | 1/2000 | Taylor | |
| 6,064,123 A | | 5/2000 | Gislason | |
| 6,629,815 B2 | | 10/2003 | Lusk | |
| 6,634,855 B1 | * | 10/2003 | Rollo | 415/206 |
| 2002/0015639 A1 | | 2/2002 | Roberts | |
| 2002/0079705 A1 | | 6/2002 | Fowler | |
| 2002/0187038 A1 | | 12/2002 | Streetman | |
| 2003/0025335 A1 | | 2/2003 | Elder | |
| 2003/0035725 A1 | | 2/2003 | Sosonkina | |
| 2003/0042743 A1 | | 3/2003 | Gingras et al. | |
| 2003/0049128 A1 | | 3/2003 | Rogan | |
| 2003/0056506 A1 | | 3/2003 | Cutcher | |

(Continued)

*Primary Examiner*—Julio Gonzalez
(74) *Attorney, Agent, or Firm*—Gordon & Rees, LLP

(57) ABSTRACT

A wind turbine, including: a rotatable frame; a plurality of airfoils extending in a direction parallel to an axis of rotation of the rotatable frame; and an enclosure surrounding the rotatable frame, wherein the enclosure comprises a plurality of moveable members configured to direct air flow onto a first half of the rotatable frame and to block air flow onto a second half of the rotatable frame to thereby cause the rotatable frame to rotate. The moveable members may be pivotable louvers that can be opened by being oriented in a direction parallel to the direction of the air flow. By changing the orientation of the pivotable louvers, the present wind turbine can generate electricity from winds blowing in any direction.

22 Claims, 4 Drawing Sheets

U.S. PATENT DOCUMENTS

| | | |
|---|---|---|
| 2003/0111844 A1* | 6/2003 | McDavid ................... 290/55 |
| 2003/0175109 A1* | 9/2003 | Brock et al. ................. 415/4.2 |
| 2003/0223858 A1 | 12/2003 | O'Connor et al. |
| 2003/0235498 A1 | 12/2003 | Boatner |
| 2004/0001752 A1 | 1/2004 | Noble |
| 2004/0036297 A1 | 2/2004 | John |
| 2004/0041407 A1 | 3/2004 | Petterson et al. |
| 2004/0042894 A1 | 3/2004 | Smith |
| 2004/0071541 A1 | 4/2004 | Rainbow |
| 2004/0141843 A1 | 7/2004 | Blank et al. |
| 2004/0141845 A1 | 7/2004 | Ohlmann |
| 2005/0079060 A1* | 4/2005 | MacManus ................ 416/235 |
| 2006/0216152 A1* | 9/2006 | Golinkin et al. ........ 416/220 R |
| 2006/0275105 A1* | 12/2006 | Roberts et al. ............. 415/4.2 |

* cited by examiner

LOUVERED HORIZONTAL WIND TURBINE

TECHNICAL FIELD

The present invention relates generally to electricity producing wind turbines, and in particular to wind turbines having airfoils.

BACKGROUND OF THE INVENTION

Many conventional wind turbine designs already exist for producing electricity. Most commonly, such designs involve a single large propeller mounted at the top end of a vertical mast. Air flow across the propeller causes the propeller to turn, which in turn rotates a generator to produce electricity.

Such conventional wind turbines suffer numerous disadvantages. First, they involve large propellers that must are mounted a considerable distance above the ground. Thus, they require a tall and sturdy mast to which the propeller is mounted. A second disadvantage of large rotating propeller blade systems is that they tend to kill a large number of birds. A third disadvantage of such designs is that the generator is typically positioned at the center of the rotating blades. Thus, the generator is mounted at the top of the mast along with the propeller. This requires the mast to be sufficiently strong to support both the propeller and the generator. As a result, it is difficult to access the turbine for repairs and servicing. A fourth disadvantage of conventional propellers is that the blades rotate in a direction perpendicular to the wind direction. As a result, propeller blade velocity through the air increases with the distance from the center of rotation of the propeller. This unfortunately requires a variable and complex blade section geometry.

SUMMARY OF THE INVENTION

The present invention provides a wind turbine, comprising: a rotatable frame; a plurality of airfoils mounted to the rotatable frame, wherein the airfoils extend in a direction parallel to an axis of rotation of the rotatable frame; and an enclosure surrounding the rotatable frame, wherein the enclosure comprises a plurality of moveable members configured to direct air flow onto a first portion of the rotatable frame and to block air flow onto a second portion of the rotatable frame.

In accordance with the invention, air flow is only directed onto the first portion of the rotatable frame, thereby causing the rotatable frame to rotate. Preferably, the moveable members comprise pivotable louvers that are opened by being oriented in a direction parallel to the direction of the air flow. In various embodiments, the enclosure formed by the moveable members may be rectangular or square or round in shape.

Air flow perpendicular to the axis of rotation of the rotatable frame causes the rotatable frame to rotate. Preferably, the rotatable frame rotates about a vertical axis. Rotation of the rotatable frame can be used to generate electricity either by way of a generator drive wheel in contact with the rotatable frame, or by the rotatable frame itself serving as the rotor of an electric generator.

The present invention also provides a method of operating a wind turbine, comprising: positioning a plurality of moveable members to direct air flow over a first portion of a wind turbine and to block air flow over a second portion of the wind turbine, thereby causing the wind turbine to rotate, wherein the wind turbine comprises: a rotatable frame; and a plurality of airfoils mounted to the rotatable frame, wherein the airfoils extend in a direction parallel to an axis of rotation of the rotatable frame. In one aspect of the method, a plurality of pivotable louvers surrounding the wind turbine are opened in a direction parallel to the direction of air flow across the first portion of the wind turbine.

In accordance with preferred methods, the moveable members are preferably positioned such that the first and second portions of the rotatable frame are approximately equal in size (comprising opposite halves of the rotatable frame, divided by a line passing through an axis of rotation of the rotatable frame).

A first advantage of the present wind turbine is that it is ideally suited to be positioned on top of a building (especially a high-rise building, since winds are often stronger and steadier at heights farther above the ground). As will be seen, the center portion of the present wind turbine is empty. Therefore, the present wind turbine can be placed on top of a building leaving room on the center of the roof of the building for structures such as elevators, and HVAC and communication equipment. As will also be shown, the present wind turbine can be used for electricity generation while catching winds approaching the building from different directions. Moreover, when used in high-rise buildings, the present wind turbine can optionally be positioned between different floors of the building.

A second advantage of the present invention is that, by using airfoils, it uses both lift over the airfoil and drag across the airfoil to cause the rotatable frame to rotate.

A third advantage of using airfoils is that the same airfoil cross section can be used across the entire width of the airfoil. Therefore, power output of the wind turbine can be increased simply by increasing the height of the airfoils. In contrast, with conventional propeller systems, it is necessary to increase the diameter of the propellers to increase overall system power output.

A fourth advantage of the present invention is that is has a low center of gravity. Therefore, it is very stable. Moreover, the present system does not require a strong, heavy mast to support a propeller and turbine some distance above the ground. This considerably reduces the weight and size limitations of the present system, resulting in cost savings as compared to traditional designs. Furthermore, having the generator drive wheel (and the turbine itself) positioned close to the ground or floor or on the roof of a building permits easy access for turbine/drive system repairs and servicing.

A fifth advantage of the present airfoil design is that each of the airfoils experience the same wind velocity along the entire length of their leading edge. Equal wind velocity at all points along the leading edge of the airfoil allows a single simplified airfoil cross section along the entire airfoil length. Thus, the wind turbine vertical height and not its horizontal diameter determines power generation. Moreover, having the airfoils disposed at the perimeter of the device results in the longest possible torque lever arm. This results in the most torque per unit of airfoil force generation.

DETAILED DESCRIPTION OF THE DRAWINGS

Figure 1:
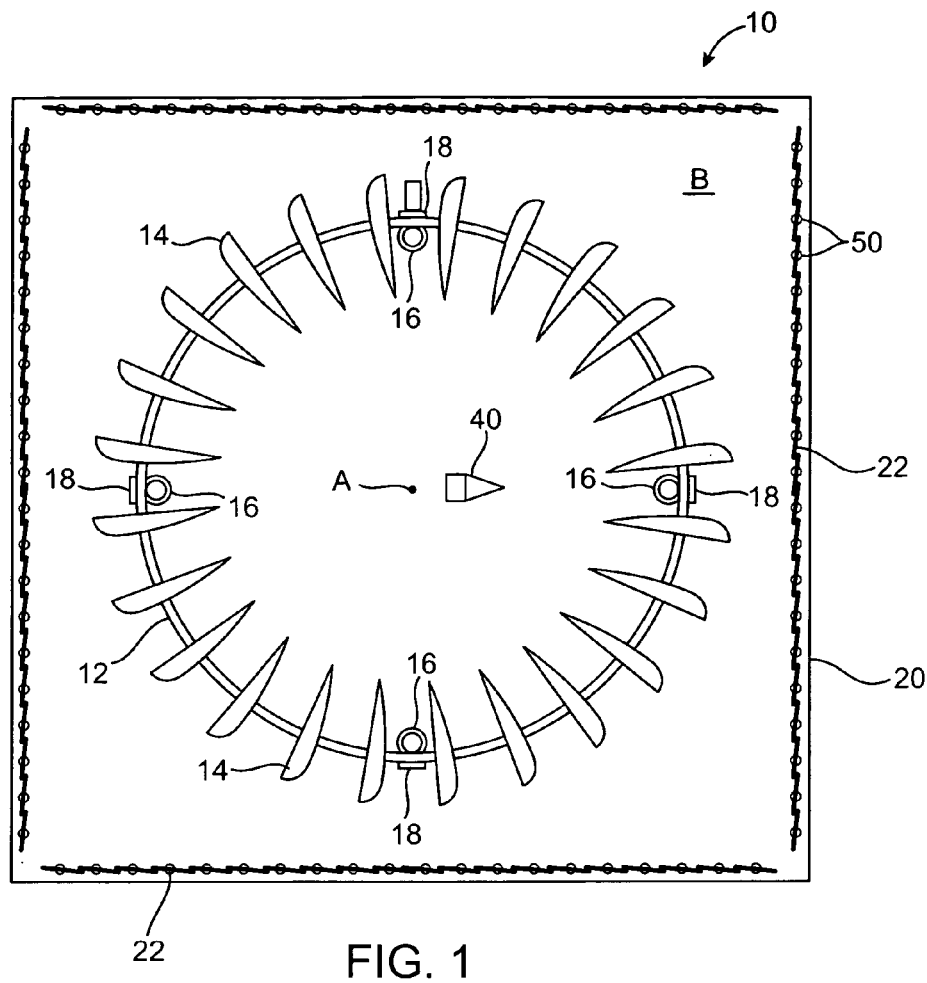
FIG. 1 is a top plan view of the present wind turbine positioned on top of a high-rise building, with the louvered enclosure fully closed.
Figure 2:
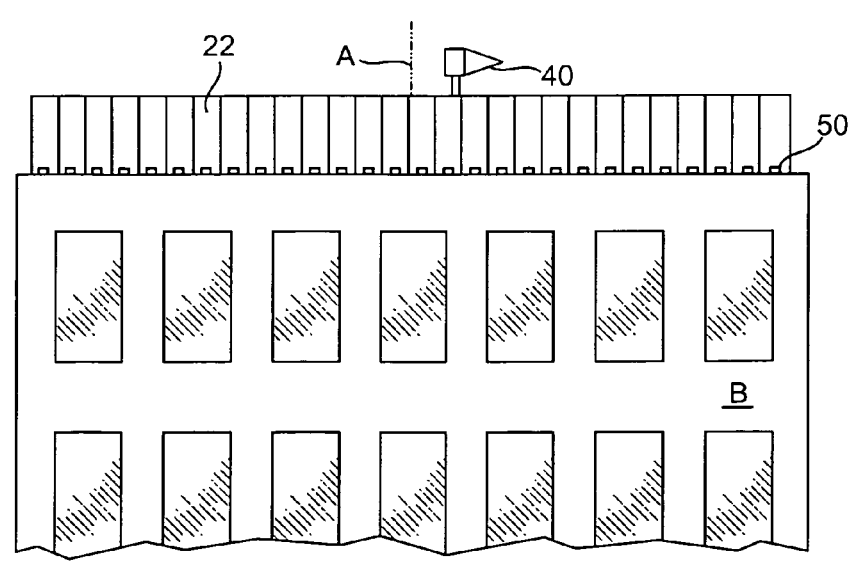
FIG. 2 is a side elevation view corresponding to FIG. 1.
Figure 4A:
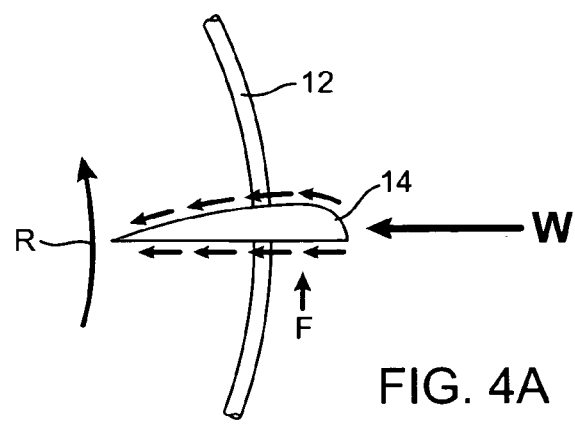
FIG. 4A is an enlarged view of one of the airfoils of FIG. 3A.
Figure 4B:
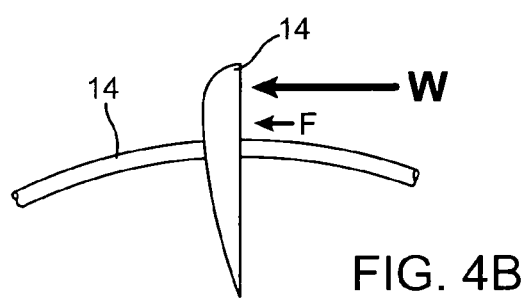
FIG. 4B is an enlarged view of another of the airfoils of FIG. 3A.
Figure 5:
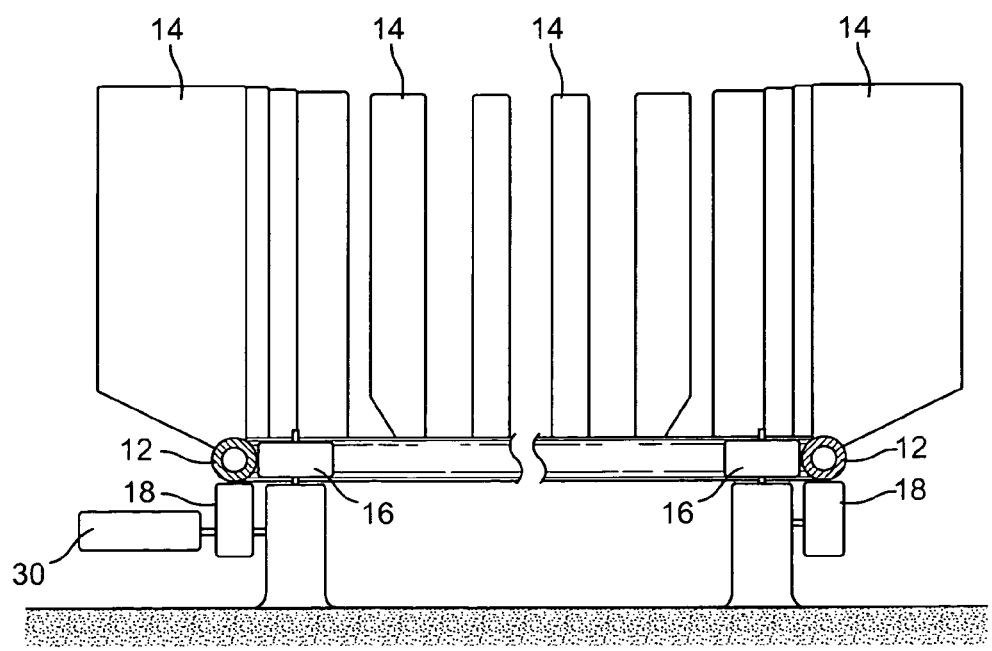
FIG. 5 is a side elevation view of a pair of alignment wheels supporting the rotatable frame of the wind turbine, taken along line L in FIG. 3A.

The present invention provides a wind turbine that is ideally suited to operate in a horizontal position on top of a building. FIGS. 1 and 2 show the wind turbine comprising a central rotatable frame surrounded by an enclosure formed by pivotable louvers. As illustrated, the pivotable louvers are positioned near the perimeter of the building. FIGS. 3A to 3D show the pivotable louvers positioned in different orientations depending upon the direction of wind approaches the wind turbine on the building. FIGS. 4A and 4B illustrate how wind causes the turbine to rotate. Lastly, FIG. 5 shows details of the structure on which the rotatable frame is mounted.

FIG. 1 shows wind turbine 10 sitting on top of building B. Wind turbine 10 includes a rotatable frame 12 having a plurality of airfoils 14 mounted thereto. Airfoils 14 extend vertically (i.e. in a direction parallel to an axis of rotation A of rotatable frame 12). Rotatable frame 12 can optionally be constructed on wheels or tracks such that it is free to rotate about vertically oriented axis of rotation A. It is to be understood that various mechanical configurations can be used to build rotatable frame 12 such that it is free to rotate about axis A. (The details of one such mechanical configuration using pairs of alignment wheels to support the rotatable frame are shown in FIG. 5. It is to be understood that the present invention is not limited to such an embodiment.)

Wind turbine 10 further includes an enclosure 20 surrounding rotatable frame 12. Enclosure 20 is formed from moveable members. As illustrated in FIGS. 1 to 3D, such moveable members may optionally comprise individually pivotable louvers 22. It is to be understood that enclosure 20 may be comprised of other moveable members. As such, it is not limited to individually pivotable louvers. Any suitable moveable member(s) may instead be used instead. It is also to be understood that enclosure 20 may fully surround all sides of rotatable frame 12 (as illustrated) but need not do so.

FIG. 2 illustrates wind turbine 10 sitting on top of a building. As illustrated, wind turbine 10 is approximately the same size as the top of building B. Although such a size may be advantageous, it is to be understood that the present invention is not so limited, since wind turbine 10 may instead be smaller than the top of building B. In addition, wind turbine 10 may optionally be positioned between different building floors. This is especially useful in high rise buildings where several of the present wind turbines may be installed at different floor locations in the high rise building.

As will be shown in FIGS. 3A to 3D, the plurality of pivotable louvers 22 forming enclosure 20 can be moved to various positions depending upon wind direction to direct air flow onto the portion of rotatable frame 12 that causes rotatable frame 12 to rotate. For example, as the direction of wind flow changes (W1, W2, W3 and W4 in FIGS. 3A to 3D) the pivotable louvers 22 can be moved to different positions such that wind flow from any of the different directions (W1, W2 W3 and W4 ) can be used to cause rotatable frame 12 to rotate. As will be shown, this is achieved by opening some of louvers 22 to direct air flow onto a first portion of rotatable frame 12 and closing some of louvers 22 to block air flow onto a second portion of the rotatable frame. Air flow directed onto the first portion of the rotatable frame causes the rotatable frame to rotate.

Figure 3A:
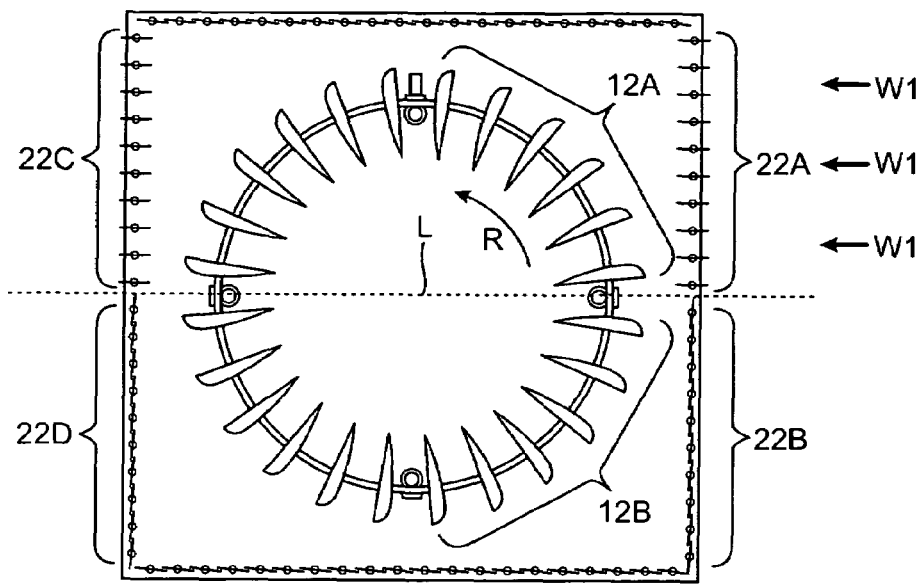
FIG. 3A is a view similar to FIG. 1, but with several of the louvers pivoted open when wind is approaching the building from direction W1.

Referring first to FIG. 3A, wind approaches wind turbine 10 from direction W1. Pivotable louvers in areas 22A and 22C are "opened" by being positioned in an orientation parallel to the direction of air flow W1 as shown. As a result, air flow is directed at area 12A of rotatable frame 12. Pivotable louvers in area 22B are closed by being positioned in an orientation perpendicular to air flow W1. As a result, air flow is blocked from reaching area 12B of rotatable frame 12.

Opening louvers in area 22A directs wind onto area 12A of rotatable frame 12. Opening louvers in area 22C permits the air flow (entering through area 22A) to exit the back of wind turbine 12. Closing louvers in area 22B blocks air flow onto area 12B of wind turbine 12. The louvers in area 22D can either be closed or open during normal operation, as is desired.

Figure 3B:
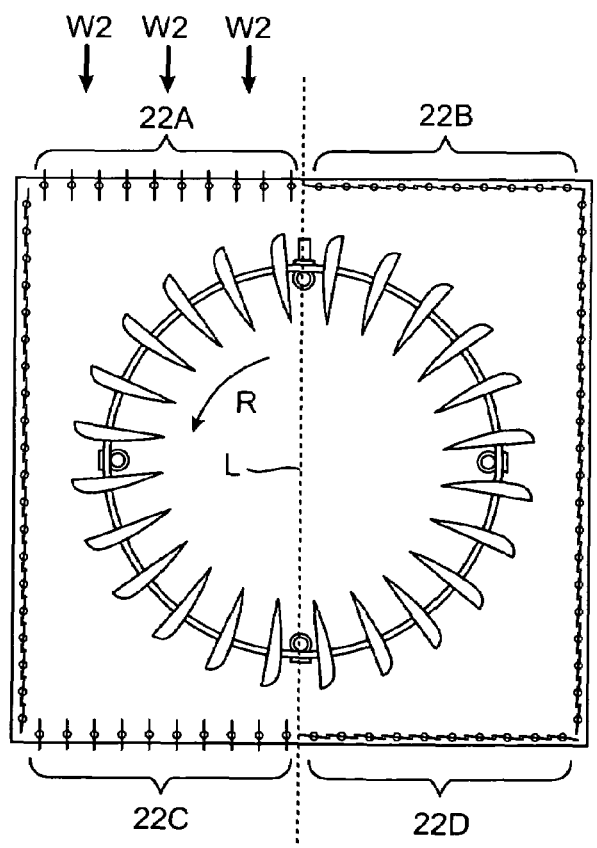
FIG. 3B is a view similar to FIG. 1, but with several of the louvers pivoted open when wind is instead approaching the building from direction W2.

Referring next to FIG. 3B, the wind changes direction and instead approaches wind turbine 10 from direction W2. The position of the pivotable louvers 22 is changed with louvers in areas 22A and 22C being "opened" parallel to wind direction W2. The pivotable louvers 22 in areas 22B and 22D are closed.

Figure 3C:
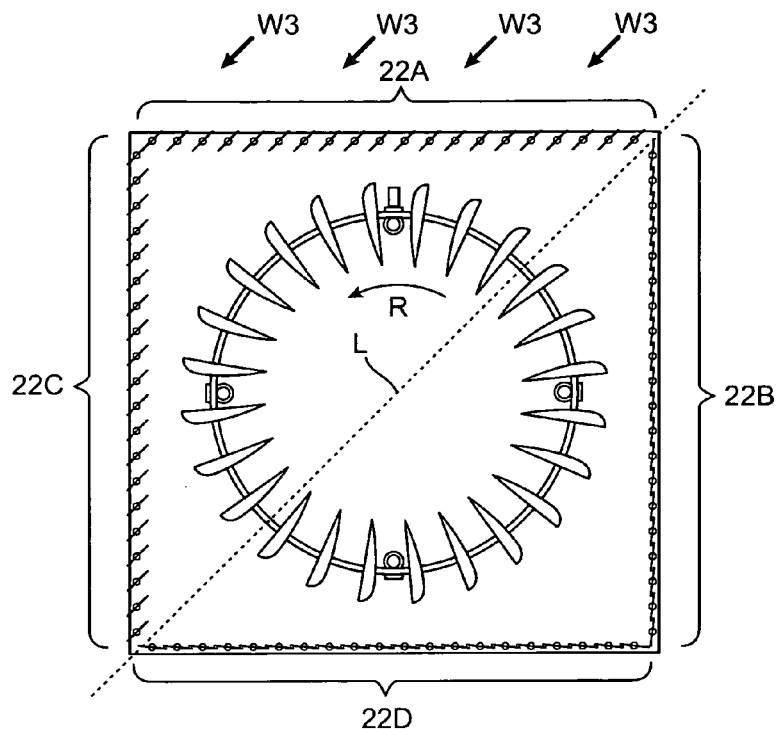
FIG. 3C is a view similar to FIG. 1, but with several of the louvers pivoted open when wind is instead approaching the building from direction W3.

Referring next to FIG. 3C, the wind changes direction and instead approaches wind turbine 10 from direction W3. The position of the pivotable louvers is changed with louvers in areas 22A and 22C being "opened" parallel to wind direction W3. The pivotable louvers 22 in areas 22B and 22D are closed.

Figure 3D:
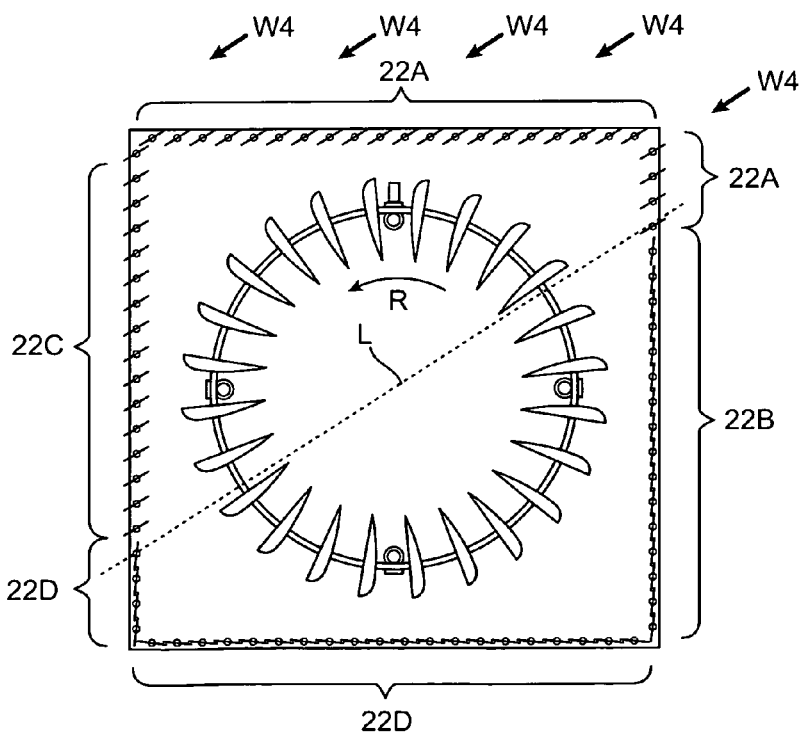
FIG. 3D is a view similar to FIG. 1, but with several of the louvers pivoted open when wind is instead approaching the building from direction W4.

Referring next to FIG. 3D, the wind changes direction and instead approaches wind turbine 10 from direction W4. The position of the pivotable louvers is changed with louvers in areas 22A and 22C being "opened" parallel to wind direction W4. The pivotable louvers 22 in areas 22B and 22D are closed.

As can be seen throughout FIGS. 3A to 3D, the first portion 12A and second portion 12B of rotatable frame 12 are of equal, or approximately equal, size. As such, louvers in areas 22A direct air flow onto one half of rotatable frame 12, while louvers in areas 22B block air flow onto the other half of rotatable frame 12. As can be seen, areas 12A and 12B comprise opposite halves of the rotatable frame, divided by a line L passing through an axis of rotation A of the rotatable frame.

FIGS. 4A and 4B show how wind flow over and across individual airfoils 14 is used to turn rotatable frame 12. First, in FIG. 4A, wind W meets airfoil 14 head on. As wind passes over the top and bottom of airfoil 14, lift is created as force F which urges rotatable frame 12 to rotate in direction R. Next, in FIG. 4B, wind W on airfoil 14 causes drag as force F which again urges rotatable frame 12 to rotate in direction R.

Lastly, FIG. 5 illustrates a mechanism permitting rotatable frame 12 to rotate about axis A, as follows. Rotatable frame 12 may comprises a circular hoop (illustrated here in cross section) with individual airfoils 14 mounted thereon, as described herein. A pair of wheels 16 and 18 may be positioned at various locations around rotatable frame 12. Four such pairs of wheels are illustrated in FIG. 1. As illustrated, rotatable frame 12 sits on top of wheels 18. Wheels 16 prevent side-to-side movement of rotatable frame 12.

In accordance with the present invention, the rotation of rotatable frame 12 can be used to generate electricity by a generator 30 in contact with one of wheels 18. An advantage of using the rotation of wheel 18 to generate electricity is that it offers gearing advantages due to the comparatively large sized rotatable frame 12 in contact with the comparatively small sized wheel 18. As a result, even a small speed of rotation of the frame 12 translates into a fast rotation of the wheel 18. In alternate embodiments, however, rotatable frame 12 may itself be a rotor of an electric generator.

In optional aspects of the invention, wind turbine 10 may further comprise an air flow direction sensor 40 such as a weather vane (FIGS. 1 and 2). Wind turbine 10 may further comprise a member positioning system 50 (FIGS. 1 and 2) that adjusts the position of the individual louvers 22 depending upon the sensed direction of wind flow. Member positioning system 50 may optionally comprise a mechanical positioning system at the bottom of each of individual louvers 22.

By continually adjusting the position of individual louvers 22 as the wind direction changes over time, wind turbine 10 can continue to generate a power output regardless of the wind direction.

What is claimed is:

1. A wind turbine, comprising:
   a rotatable frame;
   a plurality of airfoils mounted to the rotatable frame, wherein each of the airfoils have a curved side and an opposing flattened side, and wherein the airfoils extend in a direction parallel to an axis of rotation of the rotatable frame; and
   an enclosure surrounding the rotatable frame, wherein the enclosure comprises a plurality of moveable members configured to direct air flow onto a first side portion of the rotatable frame and to simultaneously block air flow onto a second side portion of the rotatable frame, wherein the first and second side portions are next to one another.

2. The wind turbine of claim 1, wherein air flow directed onto the first portion of the rotatable frame causes the rotatable frame to rotate.

3. The wind turbine of claim 1, wherein the moveable members comprise pivotable louvers.

4. The wind turbine of claim 3, wherein the pivotable louvers are opened by being oriented in a direction parallel to the direction of the air flow.

5. The wind turbine of claim 1, wherein the moveable members are positioned such that the first and second side portions of the rotatable frame are approximately equal in size.

6. The wind turbine of claim 1, wherein the moveable members are positioned to block air flow onto one half of the rotatable frame.

7. The wind turbine of claim 1, wherein the first and second side portions of the rotatable frame comprise opposite halves of the rotatable frame, divided by a line passing through an axis of rotation of the rotatable frame.

8. The wind turbine of claim 1, wherein air flow perpendicular to the axis of rotation of the rotatable frame causes the rotatable frame to rotate.

9. The wind turbine of claim 1, wherein the rotatable frame rotates about a vertical axis.

10. The wind turbine of claim 1, wherein the rotatable frame is a rotor of an electric generator.

11. The wind turbine of claim 1, further comprising:
    a generator drive wheel in contact with the rotatable frame.

12. The wind turbine of claim 1, wherein the enclosure is rectangular in shape.

13. The wind turbine of claim 1, further comprising:
    an air flow direction sensor.

14. The wind turbine of claim 13, further comprising:
    a member positioning system that moves the moveable members to direct air flow onto the first side portion of the rotatable frame and to block air flow onto the second side portion of the rotatable frame.

15. The wind turbine of claim 14, wherein the member positioning system rotates the pivotable louvers open in a direction of air flow over the first side portion of the rotatable frame.

16. A method of operating a wind turbine, comprising:
    positioning a plurality of moveable members to direct air flow over a first side portion of a wind turbine and to simultaneously block air flow over a second side portion of the wind turbine, wherein the first and second side portions are next to one another, thereby causing the wind turbine to rotate, wherein the wind turbine comprises:
    a rotatable frame; and
    a plurality of airfoils mounted to the rotatable frame, wherein the airfoils extend in a direction parallel to an axis of rotation of the rotatable frame, and wherein each of the airfoils have a curved side and an opposing flattened side.

17. The method of claim 16, further comprising:
    positioning the moveable members such that the first and second side portions of the rotatable frame are approximately equal in size.

18. The method of claim 16, wherein positioning the plurality of moveable members comprises pivoting a plurality of louvers surrounding the wind turbine.

19. The method of claim 17, wherein the first and second side portions of the rotatable frame comprise opposite halves of the rotatable frame, divided by a line passing through an axis of rotation of the rotatable frame.

20. The method of claim 16, further comprising:
    sensing the direction of air flow, and
    positioning the plurality of moveable members dependent upon the direction of air flow.

21. The wind turbine of claim 1, wherein each of the plurality of airfoils are positioned such that the flattened sides of the airfoils extend radially outwards from the axis of rotation of the rotatable frame.

22. The method of claim 16, wherein each of the plurality of airfoils are positioned such that the flattened sides of the airfoils extend radially outwards from the axis of rotation of the rotatable frame.

* * * * *